US007714800B2

(12) United States Patent
Kobayashi

(10) Patent No.: US 7,714,800 B2
(45) Date of Patent: May 11, 2010

(54) INFORMATION DISPLAY APPARATUS, INFORMATION DISPLAY METHOD AND INFORMATION RECORDING MEDIUM FOR INFORMATION DISPLAY APPARATUS

(75) Inventor: Hiroshi Kobayashi, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 1090 days.

(21) Appl. No.: 10/817,482

(22) Filed: Apr. 2, 2004

(65) Prior Publication Data
US 2004/0233186 A1 Nov. 25, 2004

(30) Foreign Application Priority Data
Apr. 14, 2003 (JP) ............................ P2003-108903

(51) Int. Cl.
G09G 5/00 (2006.01)
(52) U.S. Cl. ..................... 345/1.1; 345/173; 345/204; 345/1.2; 345/1.3
(58) Field of Classification Search .................. 345/204, 345/7, 8, 173, 1.1–1.3
See application file for complete search history.

(56) References Cited
U.S. PATENT DOCUMENTS

| 4,983,951 | A | * | 1/1991 | Igarashi et al. .............. 340/461 |
| 5,539,429 | A | * | 7/1996 | Yano et al. ................... 345/173 |
| 5,757,359 | A | * | 5/1998 | Morimoto et al. ........... 345/156 |
| 5,757,369 | A | * | 5/1998 | Ohsawa et al. .............. 715/750 |
| 6,040,824 | A | * | 3/2000 | Maekawa et al. ........... 345/173 |
| 6,067,078 | A | * | 5/2000 | Hartman ...................... 345/168 |
| 6,232,961 | B1 | * | 5/2001 | Kunimatsu et al. .......... 345/173 |
| 6,240,347 | B1 | * | 5/2001 | Everhart et al. ............... 701/36 |
| 6,351,705 | B1 | * | 2/2002 | Yoshioka ..................... 701/200 |
| 6,373,213 | B1 | * | 4/2002 | Watanabe et al. ........... 318/445 |
| 6,570,628 | B1 | * | 5/2003 | Hirano .......................... 349/11 |
| 6,628,245 | B2 | * | 9/2003 | Ogawa et al. ................... 345/7 |
| 6,629,716 | B2 | * | 10/2003 | Shibata et al. ................. 296/70 |
| 6,754,070 | B2 | * | 6/2004 | Chen .......................... 361/683 |
| 6,816,177 | B2 | * | 11/2004 | Wang et al. ................. 345/156 |
| 6,898,523 | B2 | * | 5/2005 | Cochlovius et al. ......... 701/212 |
| 6,928,654 | B2 | * | 8/2005 | Tranchina et al. ............. 725/75 |
| 6,956,540 | B1 | * | 10/2005 | Yoshihara et al. ............ 345/1.1 |
| 7,084,859 | B1 | * | 8/2006 | Pryor .......................... 345/173 |
| 7,102,632 | B2 | * | 9/2006 | Siwinski ..................... 345/212 |
| 7,373,605 | B2 | * | 5/2008 | Schaper ...................... 715/730 |
| 2002/0018057 | A1 | * | 2/2002 | Sano .......................... 345/204 |
| 2004/0130576 | A1 | * | 7/2004 | Fujita et al. ................. 345/781 |
| 2004/0164974 | A1 | * | 8/2004 | Son et al. .................... 345/204 |

FOREIGN PATENT DOCUMENTS

| EP | 1043644 A1 | 10/2000 |
| JP | S64-015478 | 1/1989 |
| JP | H05-038981 | 8/1991 |
| JP | 2000-235353 | 8/2000 |

* cited by examiner

Primary Examiner—Bipin Shalwala
Assistant Examiner—Afroza Y Chowdhury
(74) Attorney, Agent, or Firm—Ladas & Parry, LLP

(57) ABSTRACT

An information display apparatus is provided with: a display screen; a movable panel member; and a control device which controls such that the functions of a control member and/or display member that are completely or partially hidden due to said movement of said movable panel member are realized on said display screen, wherein the control device displays an image on the display screen that has an outward appearance identical to or that resembles the outward appearance of the control member or said display member.

13 Claims, 10 Drawing Sheets

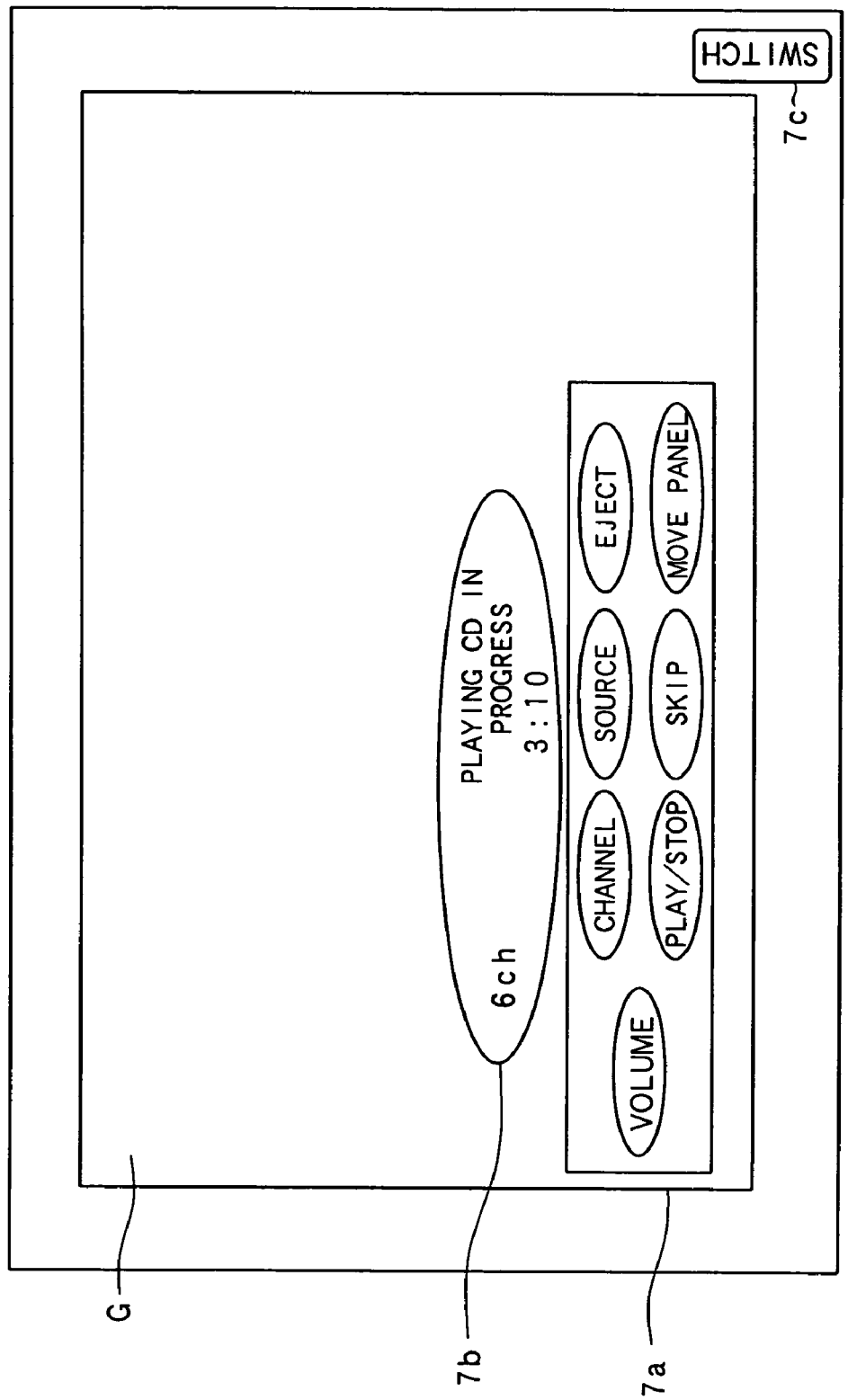

INFORMATION DISPLAY APPARATUS, INFORMATION DISPLAY METHOD AND INFORMATION RECORDING MEDIUM FOR INFORMATION DISPLAY APPARATUS

BACKGROUND OF THE INVENTION

1. Field of the Invention

This invention relates to an information-display apparatus is provided with a movable panel unit that has a display screen.

2. Related Art

In recent years it has become normal for an audio-visual apparatus or navigation apparatus such as a car-audio system to be installed in vehicles such as an automobile, and the main units of these apparatuses are installed inside or near the dashboard (the section inside the vehicle that includes the instrument panel in front of the driver's seat, the glove box section in front of the passenger's seat, and the section between the instrument panel and glove box) of the vehicle. Also, of these apparatuses there are some apparatuses that is provided with a movable panel unit that has a display screen (for example a display panel). (see; EP1043644 A1)

For example, Japanese Document 1 discloses a navigation apparatus that has a display-panel-drive apparatus that stores the display panel in the storage unit of the apparatus when it is not being used, and when it is used, pulls it out and rotates it so that it is set up and opens up. By opening up the display panel the display screen that is formed on one surface of that display panel is set at a position facing the passengers such that the display panel can be used.

However, in this prior apparatus is provided with a panel unit such as movable display panel, when the panel unit is set up in a usable state, the panel unit, covers and hides all or part of the control unit such as the various control buttons (control switches) that are located on the navigation apparatus or in the vehicle's dashboard, or display unit such as the display, and was inconvenient in that the passenger was unable to (or it is difficult to) operate the control buttons, or it is not possible to (or it is difficult to) see the display.

SUMMARY OF THE INVENTION

The object of this invention is to eliminate the aforementioned inconvenience by providing an information-display apparatus and information-display method in which it is possible to satisfactorily perform the function of the control display unit even when the control unit and display that are located in the apparatus, dashboard or the like are hidden due to the movement of the movable panel unit.

The above object of the present invention can be achieved by an information display apparatus of the present invention. The information display apparatus is provided with: a display screen; a movable panel member; and a control device which controls such that the functions of a control member and/or display member that are completely or partially hidden due to movement of the movable panel member are realized on the display screen.

According to the present invention, it is possible to realize the functions of a control unit and a display unit by the control unit and display unit that are displayed on the display screen of a display panel, even when the control unit and display unit are hidden due to the movement of the display panel, so it is possible to eliminate problems such as not being able to perform controls (or being difficult to perform controls) on the control unit, and not being able to see (or being difficult to see) the display unit. Therefore, the passenger (user) is able to perform the same controls on the control unit as performed on the control unit, and is able to see the same information on the display unit as seen on the display unit.

In one aspect of the present invention can be achieved by the information display apparatus of the present invention. The information display apparatus of the present invention is, wherein the control device displays an image on the display screen that has an outward appearance identical to or that resembles the outward appearance of the control member or the display member.

According to the present invention, it is possible to realize the functions of a control unit and a display unit by the control unit and display unit that are displayed on the display screen of a display panel, even when the control unit and display unit are hidden due to the movement of the display panel, so it is possible to eliminate problems such as not being able to perform controls (or being difficult to perform controls) on the control unit, and not being able to see (or being difficult to see) the display unit. Therefore, the passenger (user) is able to perform the same controls on the control unit as performed on the control unit, and is able to see the same information on the display unit as seen on the display unit.

In another aspect of the present invention can be achieved by the information display apparatus of the present invention. The information display apparatus of the present invention is, wherein the control device that displays an image on the display screen that changes the surface dimensions of the control member and the display member.

According to the present invention, when the AV navigation apparatus corresponds to a $1d$ in size (approx. 50 mm (H)×178 (W)), the control unit and display unit can only be small, however in that case, operability can be improved by displaying the control unit and display unit on the display screen larger than the actual control unit and display unit.

In further aspect of the present invention can be achieved by the information display apparatus of the present invention. The information display apparatus of the present invention, is further provided with: a position-detection device which detects the position of the panel member; and wherein the control device performs control such that the functions of the control member and display member are realized on the display screen according to the detected location.

According to the present invention, in this kind of display state, when the buttons on a control unit displayed on the display screen of a display panel are touched (pressed), a system-control unit recognizes that as described above, and sends that information (information that a control button on the control unit has been pressed) to a vehicle ECU (Electronic Control Unit or Engine Control Unit) via a communication bus. For example, a table that correlates the various buttons of the control unit with the various buttons of the control unit, and a table that correlates the display elements of the display unit with the display elements of the display unit are stored in a ROM of the ECU unit, and the vehicle ECU unit refers to these tables when performing control, such as controlling the air-conditioning. Also, when doing this, the vehicle ECU sends the system-control unit via the communication bus the information to be displayed on the display unit (for example, air-conditioner display). The system-control unit receives the related information and performs control such that the information is displayed on the display screen by the display unit.

In further aspect of the present invention can be achieved by the information display apparatus of the present invention. The information display apparatus is further provided with: a switch-display-instruction-receiving device which receives a s switch-display instruction from the user; and wherein the control device performs control such that the functions of the control member and display member are realized on the display screen when the switch-display instruction is received by the switch-display-instruction-receiving device.

According to the present invention, in this kind of display state, when the buttons on a control unit displayed on the display screen of a display panel are touched (pressed), a system-control unit recognizes that as described above, and sends that information (information that a control button on the control unit has been pressed) to a vehicle ECU via a communication bus. For example, a table that correlates the various buttons of the control unit with the various buttons of the control unit, and a table that correlates the display elements of the display unit with the display elements of the display unit are stored in a ROM of the ECU unit, and the vehicle ECU unit refers to these tables when performing control, such as controlling the air-conditioning. Also, when doing this, the vehicle ECU sends the system-control unit via the communication bus the information to be displayed on the display unit (for example, air-conditioner display). The system-control unit receives the related information and performs control such that the information is displayed on the display screen by the display unit.

The above object of the present invention can be achieved by an information display method of the present invention. The information display method of displaying information on the display screen of a movable-type panel member, the information display method is provided with: a moving process of performing movement control of the panel member; and a controlling process of performing control such that the functions of a control member or display member that are completely or partially hidden due to the movement of the panel member are realized on the display screen.

According to the present invention, it is possible to realize the functions of a control unit and a display unit by the control unit and display unit that are displayed on the display screen of a display panel, even when the control unit and display unit are hidden due to the movement of the display panel, so it is possible to eliminate problems such as not being able to perform controls (or being difficult to perform controls) on the control unit, and not being able to see (or being difficult to see) the display unit. Therefore, the passenger (user) is able to perform the same controls on the control unit as performed on the control unit, and is able to see the same information on the display unit as seen on the display unit.

The above object of the present invention can be achieved by an information recording medium of the present invention. The information recording medium in which an information display-processing program is recorded in a readable way by a recording computer included in an information display apparatus, the information display-processing program causing the recording computer to function as: a movement control device which performs movement control of the panel member; and a control device which performs control such that the functions of a control member or display member that are completely or partially hidden due to the movement of the panel member are realized on the display screen.

According to the present invention, it is possible to realize the functions of a control unit and a display unit by the control unit and display unit that are displayed on the display screen of a display panel, even when the control unit and display unit are hidden due to the movement of the display panel, so it is possible to eliminate problems such as not being able to perform controls (or being difficult to perform controls) on the control unit, and not being able to see (or being difficult to see) the display unit. Therefore, the passenger (user) is able to perform the same controls on the control unit as performed on the control unit, and is able to see the same information on the display unit as seen on the display unit.

BRIEF DESCRIPTION OF THE DRAWINGS

FIG. 10 is a drawing showing an example of the image display of the control unit and display unit of the AV navigation apparatus S that is displayed on the display screen of the display-panel unit 7.

DETAILED DESCRIPTION OF THE PREFERRED EMBODIMENTS

The preferred embodiments of the invention will be explained below based on the accompanying drawings. The embodiments below are embodiments for the case in which the invention is applied to an AV (Audio Visual) or navigation apparatus (hereafter referred to as a AV navigation apparatus) for an automobile.

Figure 1:
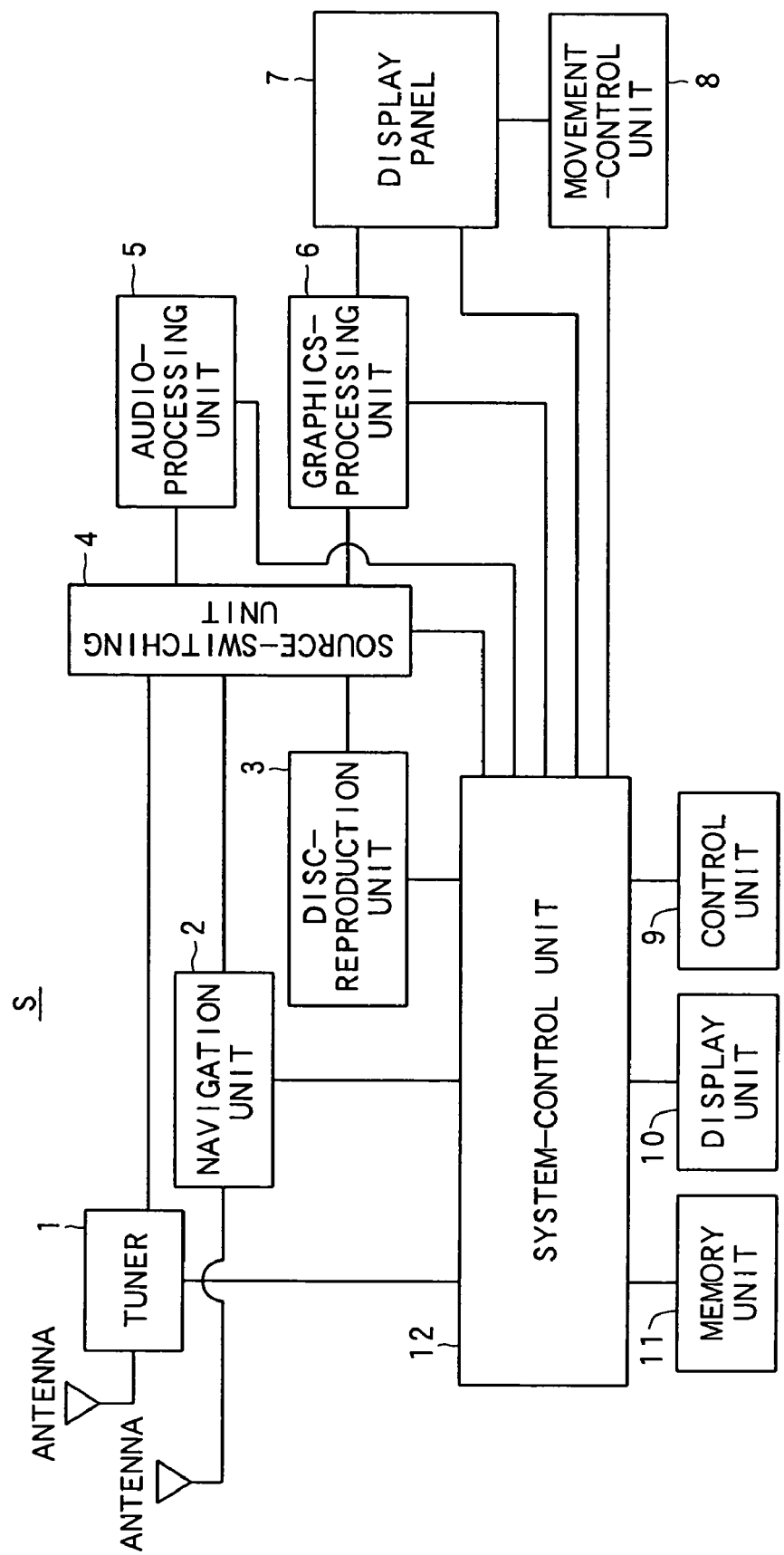
FIG. 1 is a block diagram showing the construction of an AV navigation apparatus.

First, the construction and function of the AV navigation apparatus of this embodiment will be explained with reference to FIG. 1 to FIG. 3. FIG. 1 is a block diagram showing the construction of the AV navigation apparatus. As shown in FIG. 1, the AV navigation apparatus S is provided with: a tuner 1, navigation unit 2, disc-reproduction unit 3, source-switching unit 4, audio-processing unit 5, graphics-processing unit 6, display panel 7 as the movable storage-type panel unit, a movable-control unit 8 as the movable-control device, a control unit 9 as the control unit, display unit 10 as the display unit, memory unit 11, and system-control unit 12 as the control device.

The tuner 1 converts a television signal (RF (Radio Frequency) signal) that is input via an antenna to an intermediate frequency signal, amplifies it, and together with performing AM (Amplitude Modulation) demodulation of the amplified intermediate frequency signals and generating a video signal (image signal), performs FM (Frequency Modulation)

demodulation of the amplified intermediate frequency signal and generates an audio signal. The video signal and audio signal that are generated by this tuner 1 are output to the source-switching unit 4.

The navigation unit 2 is provided with: a GPS receiving unit that receives electric waves from a GPS (Global Positioning System) satellite and detects the current position information (latitude and longitude); a sensor unit that includes a velocity sensor, acceleration sensor, and gyro sensor; and a navigation-processing unit that performs wireless communication with the navigation server (not shown in the figure) by way of an antenna and mobile communication network, and performs the navigation operation of providing map information and route-guidance information to the destination to the passenger (user). The video signal and audio signal that contains the map information, route-guidance information to the destination and the like are generated by the navigation server or navigation-processing unit and output to the source-switching unit 4.

The disc-reproduction unit 3 is provided with: a mounting mechanism for mounting a disc such as a DVD (Digital Versatile Disc) or CD (Compact Disc); a spindle motor that rotates the disc that is placed at a specified clamp position at a constant linear speed; a pick-up amp that optically reads program information (music data, video data, etc.) that is recorded on the disc and outputs it as an RF signal; a servo circuit that performs servo control of the spindle motor and pick-up amp; and a signal-processing unit that performs demodulation processing and error-correction processing of the RF signal, extracts image data and audio data, performs a specified decoding process, and generates a video signal and audio signal. The video signal and audio signal that are generated by this disc-reproduction unit 3 are output to the source-switching unit 4.

The source-switching unit 4 according to an instruction from the system-control unit 12 switches the audio signals output from the tuner 1, navigation unit 2 and disc-reproduction unit 3, and outputs a signal to the audio-processing unit 5; and switches the video signals output from the tuner 1, navigation unit 2 and disc-reproduction unit 3, and outputs a signal to the graphics-processing unit 6. In other words, the source-switching unit 4 selects a source from among the tuner 1, navigation unit 2 and disc-reproduction unit 3 from which information is to be provided to the passenger. For example, the source-switching unit 4 can be set to select the audio signal from the disc-reproduction unit 3 and select the video signal from the navigation unit 2.

The audio-processing unit 5 is provided with a DAC (Digital-to-Analog Converter) that performs digital-to-analog conversion of the audio signal that is output from the source-switching unit 4 and generates an analog audio signal; an AMP (Amplifier) that amplifies that analog audio signal; and a speaker that outputs the amplified analog-audio signal as sound waves.

The graphics-processing unit 6 performs graphic processing based on the video signal output from the source-switching unit 4 and outputs the video to the display screen of the display panel 7. Also, the graphics-processing unit 6 superimposes image data from the system-control unit 12 on the video signal output on the display screen of the display panel 7, or replaces the video with that image data (for example, a selection-menu display or selection-button image for selecting a source from among the tuner 1, navigation unit 2, and disc-reproduction unit 3, or the image of the control unit and display unit that will be described later) and displays it on the display screen.

The display panel 7 is provided with: a liquid-crystal-display unit (LCD: Liquid Crystal Display) having a display screen, and a touch-panel-input unit that includes the touch panel located on the display screen. The touch panel is formed by evaporation coating of two opposing transparent resistive layers (such as ITO indium-tin oxide) onto transparent substrate such as glass or film. The touch-panel-input unit detects the position coordinates where a finger or pen touch the top of the touch panel, and after the A/D converter performs A/D conversion, outputs a signal indicating those position coordinates to the system-control unit 12. In this way, when selection buttons are displayed on the display screen for example, when the touch panel is touched on the selection buttons, the system-control unit 12 can recognize from the signal indicating the position coordinates that the selection button was touched. Also, there is a switch button located on a corner outside the display screen as a display-switch-instruction-receiving device. When the display panel 7 is in the activated state, the switch button can be displayed on the display screen so that it can be used at any time.

When the display-panel 7 is not in use, it is stored in the storage unit in the main AV navigation apparatus S body (hereafter called the main housing), and when it is in use it is removed.

Figure 2:
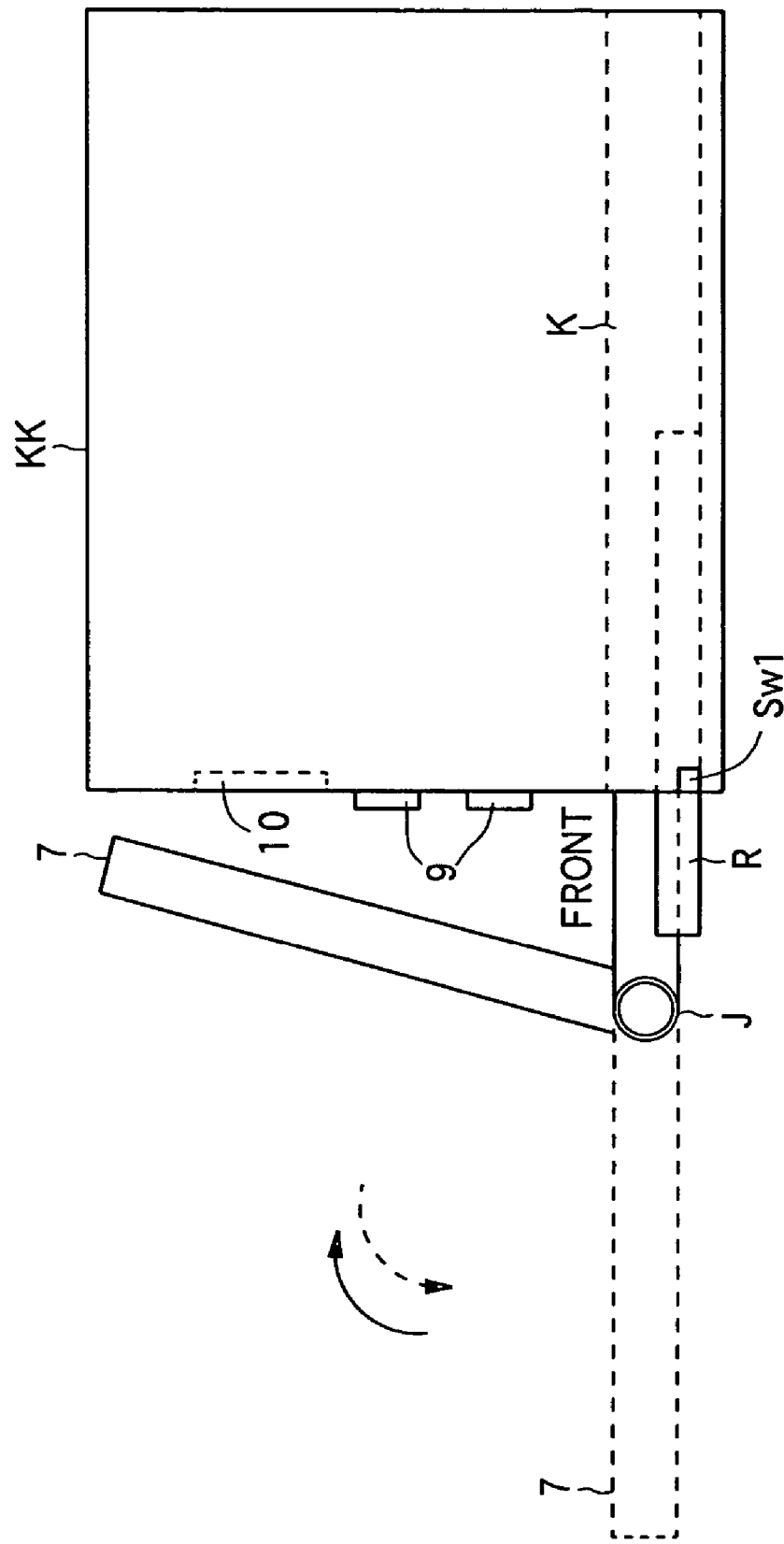
FIG. 2 is a drawing showing and example of a side view of the display-panel unit 7 and main housing when the display-panel unit 7 is pulled out from the storage unit in the main housing.

FIG. 2 shows an example of a side view of the display-panel 7 and the main housing when the display panel 7 is removed from the storage unit. In the example shown in FIG. 2, the storage unit K for storing the display panel 7 is located underneath the main housing KK.

Movement of this kind of display panel 7 is controlled by the movement-control unit 8.

The movement-control unit 8 is provided with: a rotation-motor driver (not shown in the figure) that drives the rotation motor in order to rotate the display panel 7 around the shaft J in FIG. 2; and a slider-motor driver (not shown in the figure) for moving the display panel 7 together with the removal rail R to the left or right in FIG. 2, and these drivers are both controlled by a control signal from the system-control unit 12 in order to drive the rotation motor and slider motor. The movement-control unit 8 can also be provided with a microcomputer for controlling the drivers.

Also, when using the display panel 7, the display panel 7 (including shaft J) slides along the removal rail R and is removed from the storage unit K in the main housing KK according to control from the movement-control unit 8 and the system-control unit 12. Next, the display panel 7 stands up by rotating around shaft J. From this operation the display screen that is formed on one surface of the display panel 7 is at a position such that it faces the side of the passenger and is in a usable state. On the other hand, when storing the display panel 7 after use, the series of operations described above are performed in the reverse order, and first the display panel 7 is rotated into a position such that it can be stored in the storage unit K, then in this turned down state, the display panel 7 together with shaft J slides along the removal rail R and is stored inside the storage unit K in the main housing KK.

Also, as shown in FIG. 2, there is a removal switch Sw1 on the bottom surface of the display panel 7 that functions as a position-detection unit that turns ON by coming in contact with the inside of the storage unit K (the inside of the bottom section of the opening for storing the display panel 7) when the display panel 7 is completely slid out from the storage unit K, and when the removal switch Sw1 turns ON, a 'removed' signal is output to the system-control unit 12. Also, when the user performs angle adjustment of the erected display panel 7, a signal, such as the drive pulse when driving the display panel 7 based on the angle adjustment, is output to the system-control unit 12.

As shown in FIG. 2, the control unit 9 and display unit 10 are located on the front of the main housing KK, and when the display panel 7 is removed from the storage unit K in the main housing KK and is in the usable state, they are hidden behind the display panel 7. On the other hand, when the display panel is stored in the storage unit K in the main housing KK, the control unit 9 and display unit 10 appear such that they face the side of the passenger.

Figure 3:
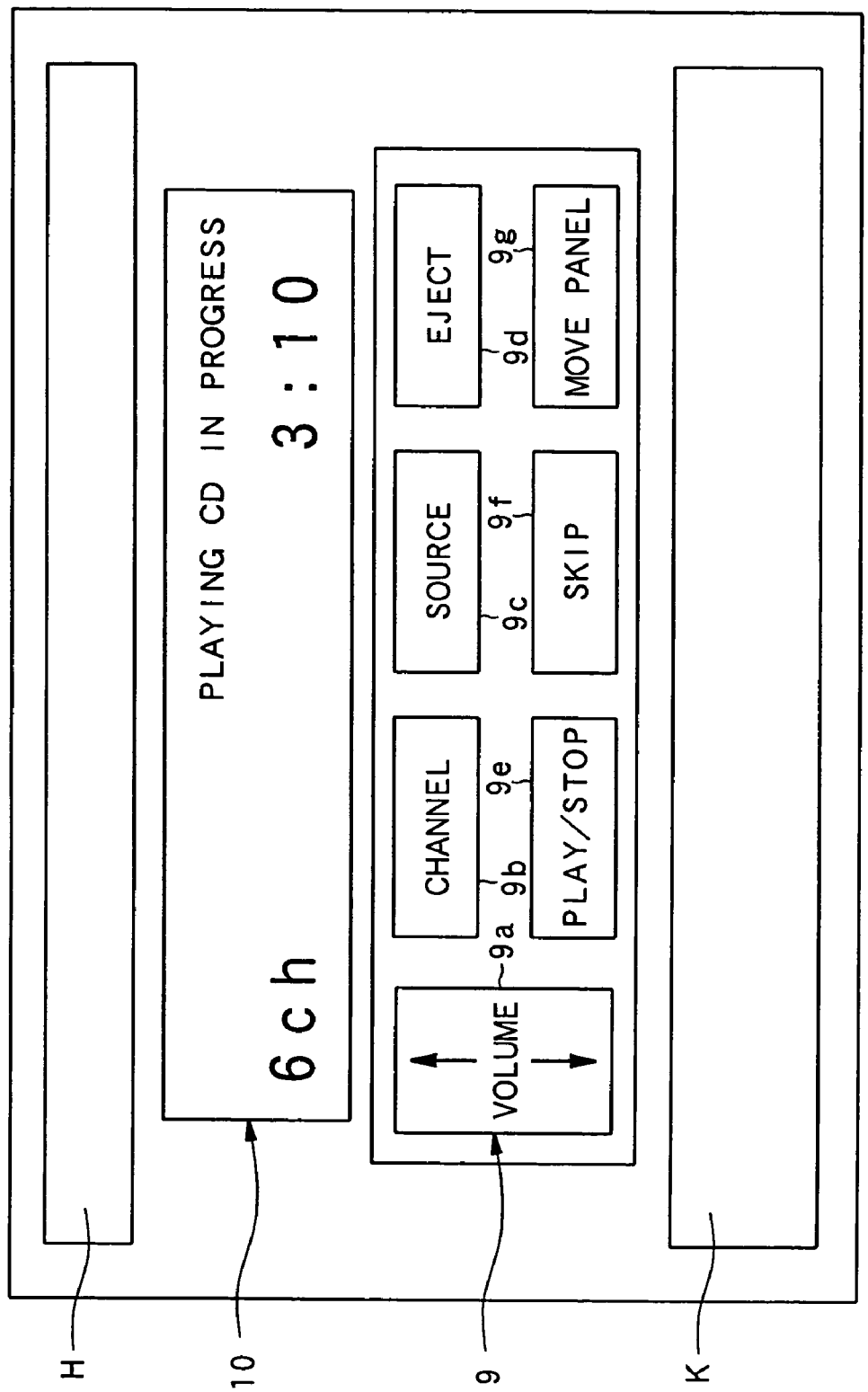
FIG. 3 is a drawing showing an example of the external appearance of the front of the main housing.

FIG. 3 is a drawing showing an example of the outer appearance of the front of the main housing KK. As shown in FIG. 3, on the front surface of the main housing KK there is an insert unit H for inserting a disc such as a DVD or CD into the disc-reproduction unit 3, a control unit 9, a display unit 10 and the storage unit K for storing the display panel 7.

In the control unit 9 there are hardware-type control buttons (control switches) such as a volume-adjustment button 9a for adjusting the volume of the sound output from the audio-processing unit 5, a channel-selection button 9b for selecting the channel of the television signal received by the tuner 1, a source-selection button 9c for switching the source provided to the passenger, an eject button 9d for ejecting the CD, DVD or the like from the disc-reproduction unit 3, control buttons 9e, 9f for performing operations such as reproducing, stopping or skipping the program information that is recorded on the CD, DVD or the like and a move-panel button 9g for moving the display panel 7 (remove or store). When the user presses the control buttons that are arranged like this, an instruction signal that corresponds to that control button is output to the system-control unit 12.

The status of the AV navigation apparatus S (for example, status such as the currently selected source, play when the disc-reproduction unit 3 is selected), the channel selected by the tuner 1, the track number and time when playing a CD, and various other information can be displayed on the display unit 10, and the display of this information is performed by the system-control unit 12.

The memory unit 11 is provided with a VRAM (Video RAM) and stores image data such as the selection-menu display for displaying the display screen of the display panel 7, selection-button images, and furthermore images for the control unit and display unit. The image data stored here is read as necessary by the system-control unit 12 and displayed on the display screen of the display panel 7.

The system-control unit 12 is provided with: a CPU (Central Processing Unit) having operation processing function; ROM (Read-Only Memory) that stores various data, tables and programs (this includes the information-display-processing program, where this information-display-processing program can be downloaded from a server over the Internet, or could be recorded and provided on a recording medium such as a CD-ROM); and RAM (Random-Access Memory) for a working area; and it controls all of the components of the AV navigation apparatus S by the CPU executing the programs. In this control, the system-control unit 12 performs control such as setting the channel received by the tuner 1, the navigation operation by the navigation unit 2, disc reproduction by the disc-reproduction unit 3, source switching by the source-switching unit 4, movement of the display panel 7 (removal and storage), and information display on the display screen of the display panel 7.

Also, by functioning as a control device, the system-control unit 12 performs control such that the functions of the control unit 9 and display unit 10 that are hidden (in this embodiment the control unit 9 and display unit 10 are completely hidden) due to the movement of the display panel 7 (when the display panel 7 moves to the usable state as shown in FIG. 2) are realized on the display screen of the display panel 7.

Here, the function of the control unit 9 is the function of displaying the various control buttons of the control unit to the passenger, and outputting instruction signals to the system-control unit 12 that correspond to the control buttons pressed by the passenger. Also, the function of the display unit 10 is the function of displaying the information that is displayed by the display unit 10.

Next, the control that makes it possible to realize the function of the control unit 9 and display unit 10 on the display screen of the display panel 7 well be explained with reference to FIG. 4 to FIG. 6.

Embodiment 1

Figure 4:
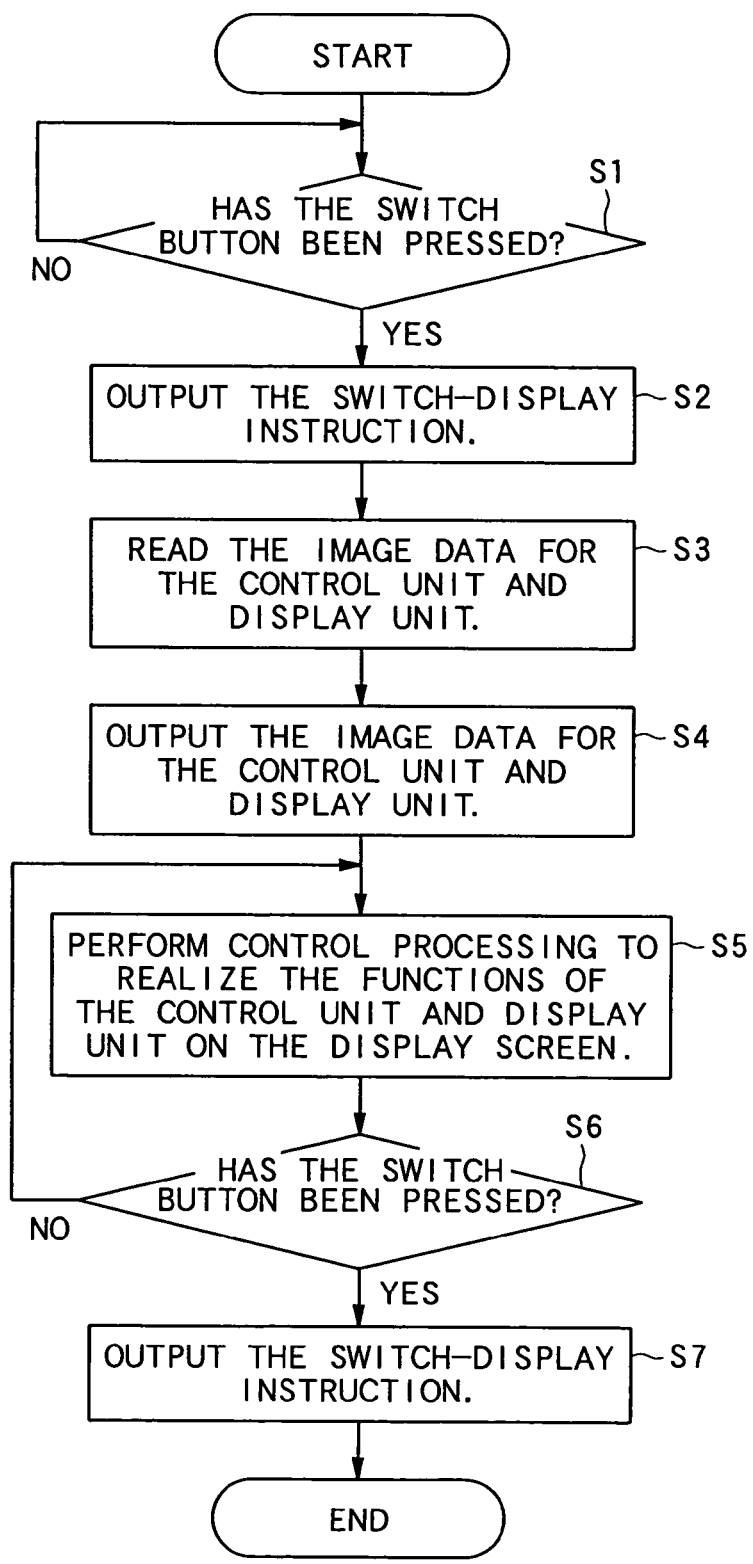
FIG. 4 is a flowchart showing an example of the processing by the system-control unit 12 of a first embodiment in the case where the control unit 9 and display unit 10 are displayed on the display screen of the display-panel unit 7.

FIG. 4 is a flowchart showing an example of the processing by the system-control unit 12 of the first embodiment when realizing the function of the control unit 9 and display unit 10 on the display screen of the display panel 7. This first embodiment is an example of when the display panel 7 is removed from the storage unit K in the main housing KK and is in the usable state, and where the navigation unit 2 is selected as the source and map information is displayed on the display screen of the display panel 7.

In this kind of display state, when the passenger presses the switch button 7c (see FIG. 5) at the bottom right corner of the display panel for example, in response to this (the system-control unit 12 receiving the display-switch instruction; step S1) the system-control unit 12 outputs a command (switch-display command) to the source-switching unit 4 in order to switch the video signal from the navigation unit 2 to the image data from the system-control unit 12 (step S2).

Next, the system-control unit 12 reads the image data recorded in the memory unit 11 for the images of the control unit 9 and display unit 10 (step S3), and outputs that data to the graphics-processing unit 6 (step S4). By doing this, the image data is processed by the graphics-processing unit 6, and that image is then displayed on the display screen of the display panel 7.

Figure 5:
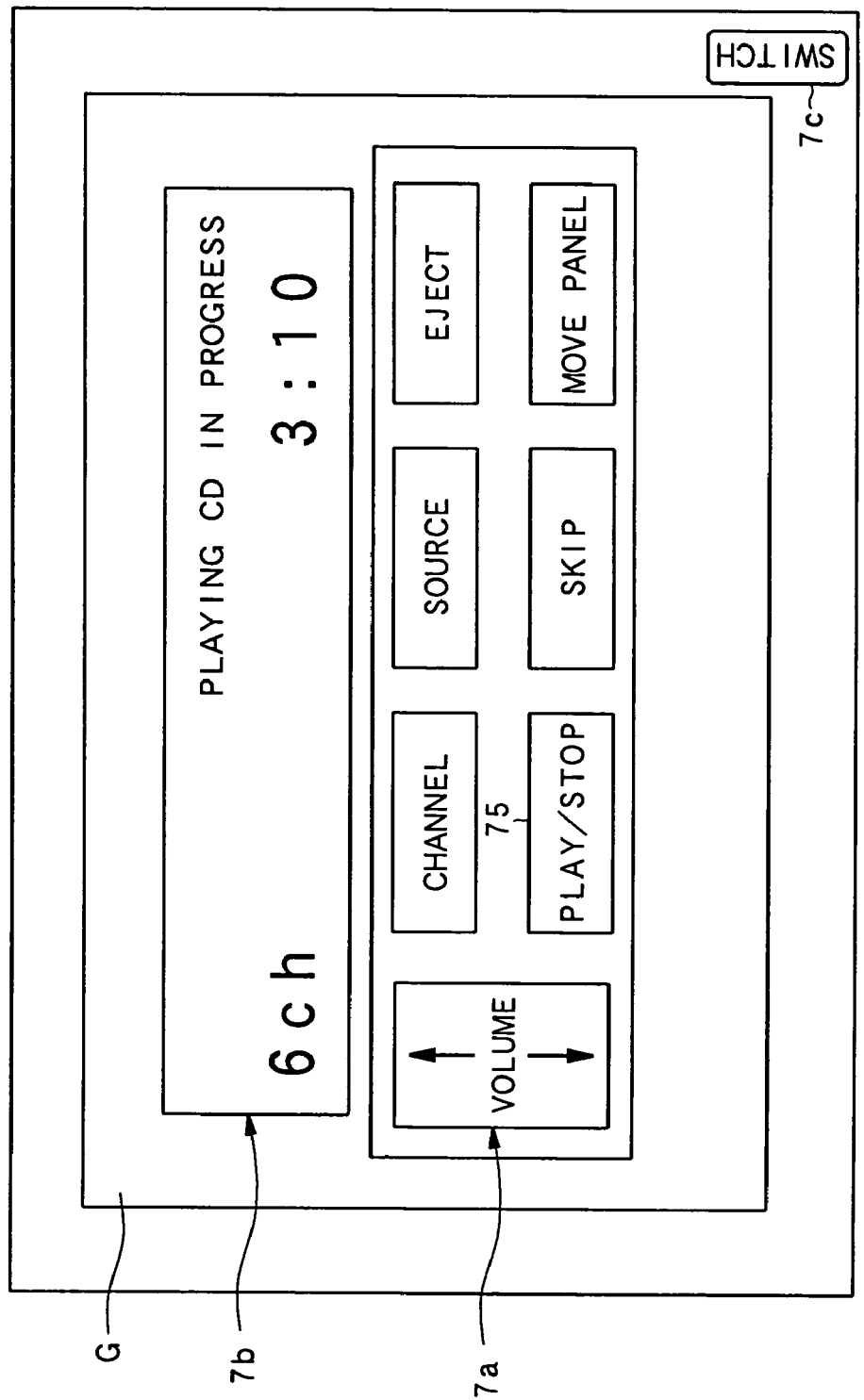
FIG. 5 is a drawing showing an example of an image display of the control unit and display unit of the AV navigation apparatus S that is displayed on the display screen of the display-panel unit 7.

FIG. 5 is a drawing showing an example of the image display of the control unit and display unit that are displayed on the display screen of the display panel 7. As shown in FIG. 5 a control unit 7a that corresponds to the control unit 9 on the front of the main housing KK shown in FIG. 3 and a display unit 7b that corresponds to the display unit 10 are displayed on the display screen G of the display panel.

In this kind of display state, the system-control unit 12 performs a control process such that the functions of the control unit 9 and display unit 10 are realized on the display screen G of the display panel 7 (step S5). In other words, it performs control such that the function of the control unit 9 described above is realized by the displayed control unit 7a, and that the function of the display unit 10 is realized by the displayed display unit 7b. For example, a table that correlates the various buttons of the control unit 9 with the various buttons of the control unit 7a, and a table that correlates the display elements of the display unit 10 with the display elements of the display unit 7b are stored in the ROM of the system-control unit 12, and the system-control unit 12 refers to these tables when performing control. For example, when the passenger touches (presses) the reproduction-control button 75 in the control unit 7a, a signal indicating the position coordinates of the reproduction-control button 75 is output from the touch-panel input unit of the display panel 7 to the system-control unit 12, and according to that signal, the system-control unit 12 performs the same control as when the reproduction-control button 9e in the control unit 9 is pressed, or in other words, outputs a reproduction instruction to the disc-reproduction unit 3 to reproduce the disc (for example, CD). Also, when doing this, the system-control unit 12 performs control such that the information that is to be displayed in the display unit 10 (for example, the CD is being played) is displayed in the display unit 7b.

When the passenger desires to listen to music on CD while looking at map information provided by the navigation unit 2, for example, the user can the CD reproduction control in this way without having to store the display panel 7.

Also, when the passenger press the switch button 7c on the bottom right corner of the display panel 7, for example, according that that (step S6) the system-control unit 12 ends the control process of step 5 and outputs a switch-display command to the source-switching unit 4 in order to switch the image data from the system-control unit 12 to the video signal from the navigation unit 2 (step S7). In this way, the display state returns to the state in which the map information is displayed on the display screen of the display unit 7.

Embodiment 2

Figure 6:
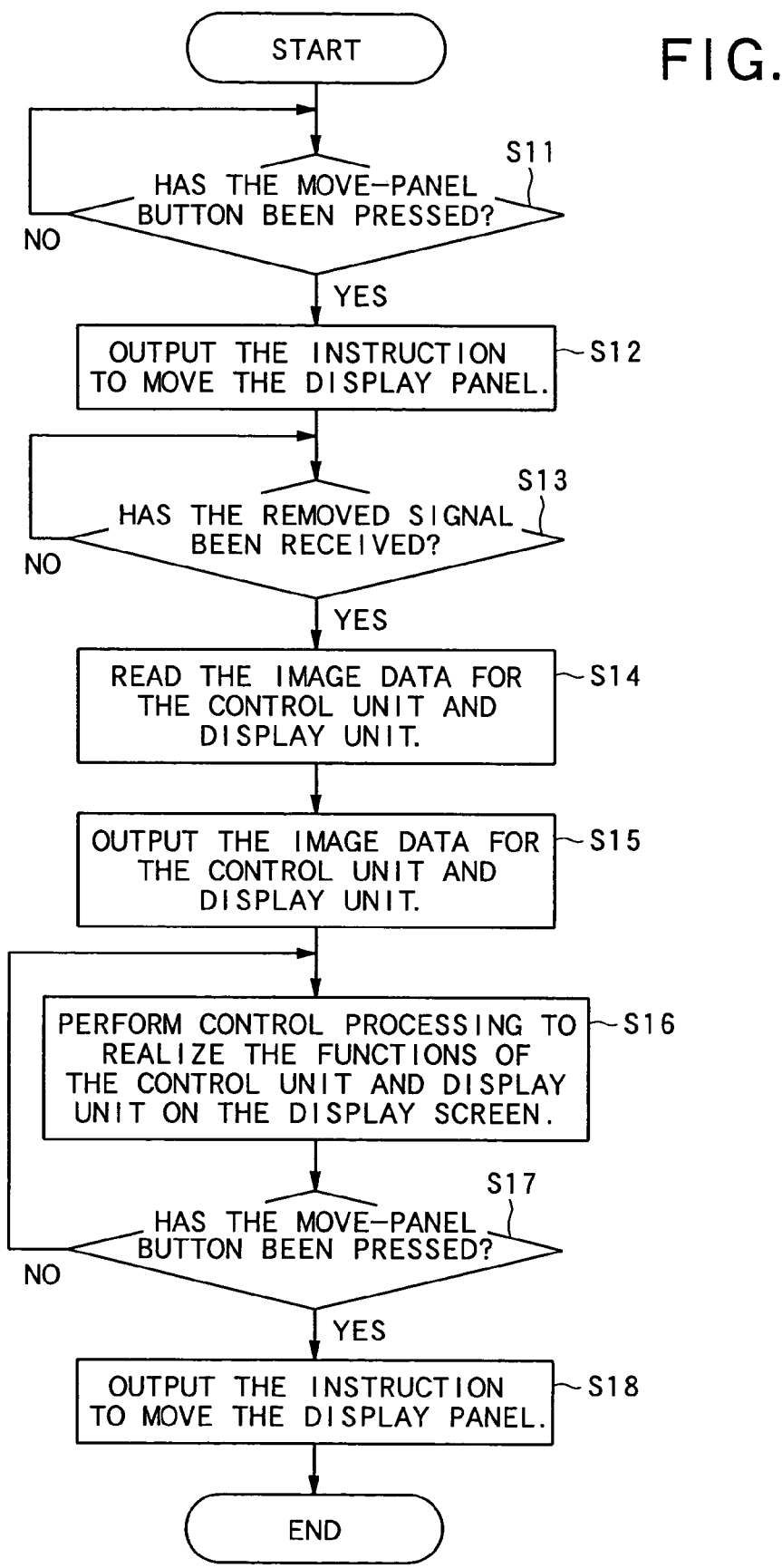
FIG. 6 is a flowchart showing an example of the processing by the system-control unit 12 of a second embodiment in the case where the control unit 9 and display unit 10 are displayed on the display screen of the display-panel unit 7.

FIG. 6 is a flowchart showing an example of the processing by the system-control unit 12 of a second embodiment when the functions of the control unit and display unit 10 are realized on the display screen of the display panel 7. This second embodiment is an example of when the display panel is stored in the storage unit K of the main housing KK.

When the user presses the move-panel button in the control unit 8 on the front of the main housing KK, for example, according to this (step S11) the system-control unit 12 outputs a move command to the movement-control unit 8 in order to remove the display panel 7 (step S12). By doing this, the movement-control unit 8 performs control such that the display panel 7 is removed from the storage unit K in the main housing KK, and performs control such that the display panel 7 rotates around the shaft J. The display panel 7 is set into the usable state in this way, and by doing this, the removal switch Sw1 located on the bottom surface of the display panel 7 is turned ON and the removed signal is output to the system-control unit 12.

When the system-control unit 12 receives the removed signal (recognizes that the display panel is in the usable state), according to that (step S13), it reads the image data recorded in the memory unit 11 for the images of the control unit and display unit (step S14), and outputs that image data to the graphics-processing unit 6 (step S15). By doing this, the image data is processed by the graphics-processing unit 6, and as in the first embodiment, the image is displayed on the display screen G of the display panel 7 as shown in FIG. 5. In this kind of display state, the system-control unit 12, as in the first embodiment, performs control such that the functions of the control unit 9 and display unit 10 are realized on the display screen G of the display panel 7 (step S16). In this kind of display state, when the passenger presses the switch button 7c located on the display panel 7, as in the first embodiment, the contents displayed on the display screen G are switched to those from another source.

When the display panel 7 is removed, instead of the control unit 9 and display unit 10, the display unit 7a and display unit 7b are automatically provided to the passenger on the display screen G of the display panel 7 in this way, which is efficient.

Also, when the passenger presses the move-panel button 9g on the control unit 9 on the front of the main housing KK again, according to this (step S17), the system-control unit 12 ends the control process of step S16 and outputs a move command to the movement-control unit 8 in order to store the display panel 7 (step S18).

As explained above, with this embodiment, it is possible to realize the functions of the control unit 9 and display unit 10 by the control unit 7a and display unit 7b that are displayed on the display screen G of the display panel 7, even when the control unit 9 and display unit 10 are hidden due to the movement of the display panel 7, so it is possible to eliminate problems such as not being able to perform controls (or being difficult to perform controls) on the control unit 9, and not being able to see (or being difficult to see) the display unit 10. Therefore, the passenger (user) is able to perform the same controls on the control unit 7a as performed on the control unit 9, and is able to see the same information on the display unit 7b as seen on the display unit 10.

In this embodiment, the case in which the control unit 9 and display unit 10 of the AV navigation apparatus S were hidden was explained, however it is not limited to this, and this embodiment could also be applied to the case in which the control unit or display unit in the instrument panel on the vehicle side are the control unit and display unit, and are hidden by the movement of the display panel 7. An embodiment in this case will be explained below.

Figure 7:
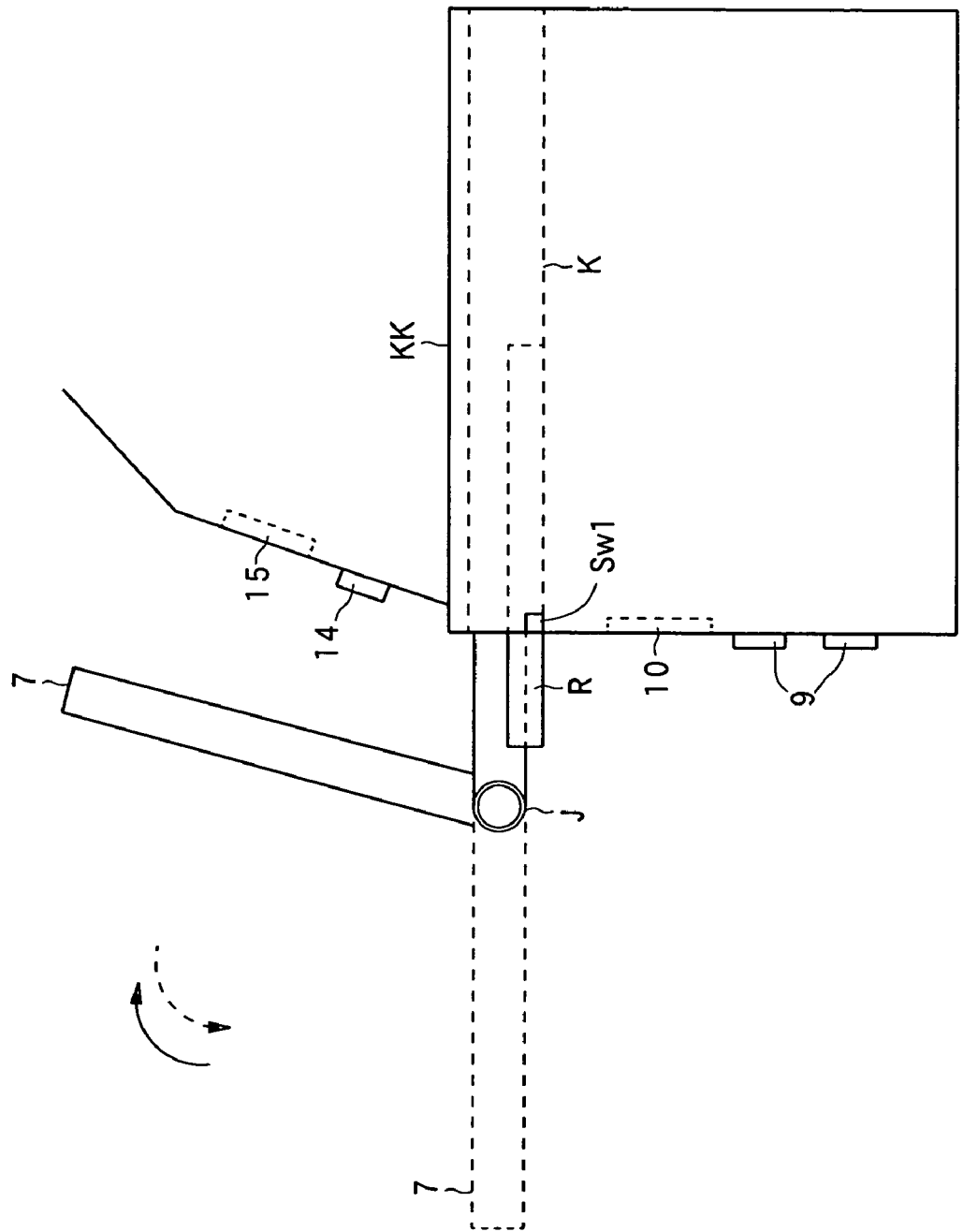
FIG. 7 is a drawing showing another example of a side view of the display-panel unit 7 and main housing when the display-panel unit 7 is pulled out from the storage unit in the main housing.
Figure 8:
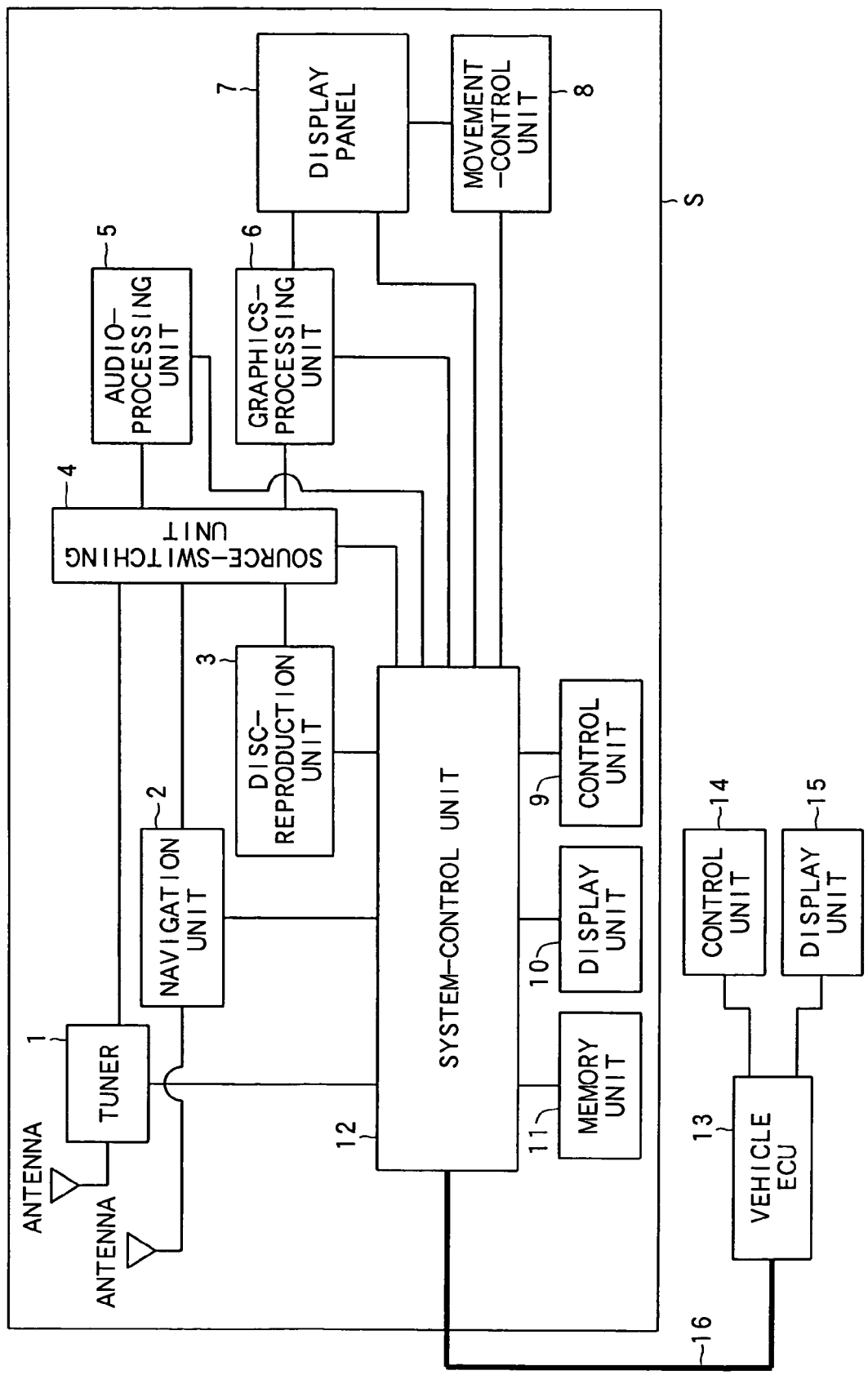
FIG. 8 is a block diagram showing an example of the construction of an AV navigation apparatus and vehicle ECU.

FIG. 7 is a drawing showing another example of a side view of display panel 7 and main housing when the display panel 7 is removed from the storage unit in the main housing. FIG. 8 is a block diagram showing the construction of the AV navigation apparatus and vehicle ECU (Electronic Control Unit or Engine Control Unit).

The example shown in FIG. 7 is different from the example shown in FIG. 2 in that the storage unit K for storing the display panel 7 is located at the top of the main housing KK, however, the other construction and function of the AV navigation apparatus S is the same as that shown in FIG. 1. Therefore, the same reference numbers that were used for the components of the AV navigation apparatus S shown in FIG. 1 will be used for the components of the AV navigation apparatus S shown in FIG. 8. Also, in FIG. 8, the system-control unit 12 of the AV navigation apparatus S is connected with the vehicle ECU 13 via a communication bus 16, such that they can send data between each other. Furthermore, the control unit 14 and the display unit 15 that are located in the instrument panel or the like on the vehicle side are connected to the vehicle ECU 13.

The vehicle ECU 13 is provided with: a CPU having a operation processing function; a ROM for storing various data, tables and programs; and a working RAM; and it receives signals from the sensors located in the vehicle and instruction signals from the control unit 14, and controls the air conditioning, instruments inside the vehicle, information displayed on the display unit 15.

In this AV navigation apparatus S, the storage unit K is located at the top of the main housing KK as shown in FIG. 7, so when the display panel 7 is moved and set into the usable state it hides the control unit 14 and display unit 15 that are located in the instrument panel or the like on the vehicle side. Therefore, the system-control unit 12 performs control such that the functions of the control unit 14 and the display unit 15 that are hidden due to the movement of the display panel 7 are realized on the display screen of the display panel 7. In this case, the processing shown in FIG. 4 and FIG. 6 can be applied to the processing by the system-control unit 12. Also, in this case, image data for the images of the control unit 14 and display unit 15 located on the vehicle side is stored in the memory unit 11, and the system-control unit 12 reads the related image data and displays it on the display screen of the display panel 7.

Figure 9:
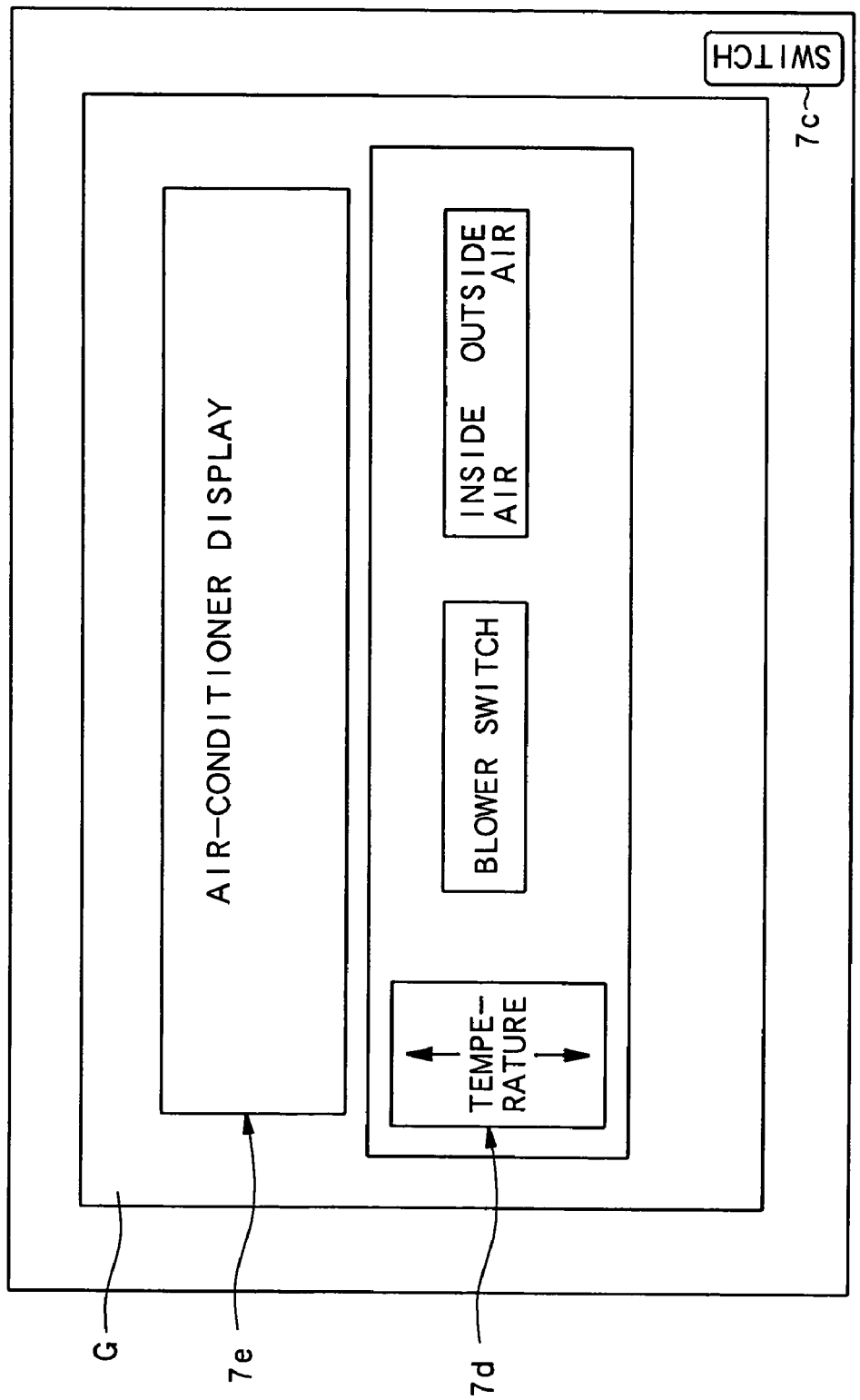
FIG. 9 is a drawing showing an example of the image display of the control unit and display unit on the vehicles side that is displayed on the display screen of the display-panel unit 7.

FIG. 9 is a drawing showing an example of the image display for the control unit and display unit on the vehicle side that is displayed on the display screen of the display panel 7. As shown in FIG. 9, control unit 7d and display unit 7e that correspond to the control unit 14 and display unit 15 located on the vehicle side are displayed on the display screen G of the display panel 7.

In this kind of display state, when the buttons on the control unit 7d displayed on the display screen G of the display panel are touched (pressed), the system-control unit 12 recognizes that as described above, and sends that information (information that a control button on the control unit 7d has been pressed) to the vehicle ECU 13 via the communication bus 16. For example, a table that correlates the various buttons of the control unit 14 with the various buttons of the control unit 7d, and a table that correlates the display elements of the display unit 15 with the display elements of the display unit 7e are stored in the ROM of the ECU unit 13, and the vehicle ECU unit 13 refers to these tables when performing control, such as controlling the air-conditioning. Also, when doing this, the vehicle ECU 13 sends the system-control unit 12 via the communication bus 16 the information to be displayed on the display unit 15 (for example, air-conditioner display). The system-control unit 12 receives the related information and performs control such that the information is displayed by the display unit 7e on the display screen G of the display panel 7.

In this case as well, when the control unit 14 and display unit 15 that are located in the instrument panel or the like on the vehicle side are hidden due to the movement of the display panel 7 in this way, the same effect can be obtained as was described for the embodiment above when the control unit 9 and display unit 10 located in the AV navigation apparatus S were hidden.

In the example shown in FIG. 5 (or FIG. 9) of the embodiment described above, a control unit 7a and display unit 7b (or control unit 7d and display unit 7e) that have the same outward appearance as the control unit 9 and display unit 10 (or control unit 14 and display unit 15) are displayed on the display screen G of the display panel 7, however, the embodiment is not limited to this, and as long as the functions of the control unit 9 and display unit 10 (or control unit 14 and display unit 15) are realized, the outward appearance of the control unit 7a and display unit 7b (or control unit 7d and display unit 7e) does not have to be the same as the outward appearance of the control unit 9 and display unit 10 (or control unit 14 and display unit 15). For example, the outward appearance of the control unit 9 and display unit 10 (or control unit 14 and display unit 15) could be partially changed (for example, a change in design) such that overall it still resembles the original, or as shown in FIG. 10, it is possible to reduce the size (change the shape of the buttons) of the control unit 7a and display unit 7b (or similarly control unit 7d and display unit 7e, not shown in the figure) and display them at the bottom left of the display screen G. Also, when the AV navigation apparatus S corresponds to a 1*d* in size (approx. 50 mm (H)×178 (W)), the control unit 9 and display unit 10 can only be small, however in that case, operability can be improved by displaying the control unit 7a and display unit 7b on the display screen G larger than the actual control unit 9 and display unit 10.

The embodiment described above can also be constructed such that it is also possible to superimpose the display of the control unit 7a and display unit 7b (or control unit 7d and display unit 7e) on the top of map information or the like that is already displayed on the display screen G of the display panel 7. Also, the embodiment described above can be constructed such that display range of map information or the like that is already displayed on the display screen on the display panel 7 is compressed to create empty are a on the display screen G so that the control unit 7a and display unit 7b (or control unit 7d or display unit 7e) can be displayed in the created empty space. In these cases, the system-control unit 12 controls the source-switching unit 4 such that together with the video signal from the navigation unit 2 it outputs the image data stored in the memory unit 11 to the graphics-processing unit 6. Also, the graphics-processing unit 6 performs graphics processing in order to display the output video signal and image data on the display screen G of the display panel 7. It is also possible to have construction such that according to an instruction from the user it is possible to change between superimposing the image data onto the map information or the like on the display screen G, or to dividing the display into map information and the like and the image data. Furthermore, construction is also possible in which the functions of either the control unit 9 or the display unit 10 (or the control unit 14 or display unit 15) are realized on the display screen G of the display panel 7. In this case, the system-control unit 12 controls the source-switching unit 4 such that either the image data for the control unit or the image data for the display unit that is stored in the memory unit 11 is output. For example, it recognizes the movement state of the display panel 7 according to a signal that is output from the movement-control unit 8, and determines whether the control unit or display unit is hidden by the display panel 7. When just the display unit is hidden, the system-control unit 12 controls the source-switching unit such that only the image data for the display unit is output from the memory unit 11. This is made possible by preparing data in advance for determining which unit is hidden according to the movement state of the display panel 7.

Also, in the embodiments described above, an example of the case in which the entire control unit 9 and display unit 10 (or control unit 14 or display unit 15) was explained, however, the embodiment is not limited to this, and construction is also possible in which the functions of the control unit 9 and display unit 10 (or control unit 14 and display unit 15) are realized on the display screen of the display panel 7 even when part of the control unit 9 and display unit 10 (or control unit 14 and display unit 15) is hidden due to the movement of the display panel 7. For example, the case in which the area of the front of the display panel 7 is small with respect to the area of the control unit 9 and display unit 10 (or control unit 14 and display unit 15) is possible.

In the embodiments described above, the display panel 7 was constructed such that it has a touch panel and such that the functions of the control unit 9 (or control unit 14) are realized on the display screen G, however, the embodiment is not limited to this, for example, construction is possible in which the functions of the control unit 9 (or control unit 14) are realized by making it possible to control the control unit 9 displayed on the display screen G using a remote control apparatus. In this case, construction can be such that when a control button on the remote control is pressed, the control button on the display screen G that corresponds to that button is highlighted so that it is clear which button is pressed.

Also, in the embodiments described above, a storage-type display panel 7 that is stored in a storage unit K in the main housing KK was explained as one example of a panel member, however, the embodiment is not limited to this, and it is possible to employ a rotation-type display panel. A rotation-type display panel has a display screen like in the embodiment described above on the front of the panel, and a control unit and display unit like in the embodiment above on the back of the panel, and by rotating the display panel around a shaft, the surface that faces the passenger can be changed between the front of the panel or the back of the panel. With this kind of display panel as well, it is possible to perform control such that the functions of the control unit and display unit that are hidden by the rotation are realized on the display screen of the display panel.

Also, in the embodiments described above, the case of applying the invention to the AV navigation apparatus for an automobile was explained, however, the invention is not limited to this, and it could also be applied to the navigation apparatus for an automobile, AV apparatus for an automobile, or AV apparatus for home use.

It should be understood that various alternatives to the embodiment of the invention described herein may be employed in practicing the invention. Thus, it is intended that the following claims define the scope of the invention and that methods and structures within the scope of these claims and their equivalents be covered thereby.

The entire disclosure of Japanese Patent Application No. 2003-108903 filed on Apr. 14, 2003 including the specification, claims, drawings and summary is incorporated herein by reference in its entirety.

What is claimed is:

1. An apparatus comprising:
   a display screen configured for movement between a first position and a second position, wherein the display screen at least partially covers a control switch when the display screen is in the second position; and
   a control device configured to display an image of a selection button corresponding to the control switch on the display screen being in the second position, and to offer functionality of the control switch on the display screen in the second position based on the user's touching the selection button, the operation of the control switch being unavailable based on the display screen being in the second position.

2. The apparatus according to claim 1, wherein the control device displays on the display screen an image that has an appearance identical to or that resembles the appearance of the control switch.

3. The apparatus according to claim 1, wherein said control device displays an image on said display screen that changes the surface dimensions of said control switch.

4. The apparatus according to claim 1, further comprising:
   a position-detection device which detects the position of said display screen, wherein said control device offers functionality of the control switch on the display screen based on the position detected by the position-detection device.

5. The apparatus according to claim 1, further comprising:
   a switch-display-instruction-receiving device which receives a switch-display instruction from a user for switching a display on the display screen; wherein said control device offers functionality of the control switch on the display screen based on the instruction received by the switch-display-instruction-receiving device.

6. The apparatus of according to claim 1, further comprising:
   a movement-control device which controls the movement of said display screen.

7. The apparatus according to claim 1, wherein said display screen is associated with a panel member that is a storage-type panel member.

8. The apparatus according to claim 1, wherein said display screen is associated with a panel member is a rotation-type panel member.

9. A method comprising:
   moving a display screen from a first position to a second position, wherein the display screen at least partially covers a control switch and/or a display unit when the display screen is in the second position; and
   displaying an image of a selection button corresponding to the control switch on the display screen being in the second position, and offering functionality of the control switch on the display screen in the second position based on the user's touching the selection button, the operation of the control switch being unavailable based on the display screen being in the second position.

10. A recording medium readable by a computer, tangibly embodying a program executable by the computer to perform a method, the method comprising:
    activating a movement control device to move a display screen from a first position to a second position, wherein the display screen at least partially covers a control switch when the display screen is in the second position; and
    displaying an image of a selection button corresponding to the control switch on the display screen being in the second position, and offering functionality of the control switch on the display screen in the second position based on the user's touching the selection button, the operation of the control switch being unavailable based on the display screen being in the second position.

11. The apparatus according to claim 1, wherein an operation of the control switch is available by a user's press.

12. The method according to claim 9, wherein an operation of the control switch is available by a user's press.

13. The recording medium readable by a computer according to claim 10, wherein an operation of the control switch is available by a user's press.

* * * * *